United States Patent
Lush

(10) Patent No.: US 7,302,911 B1
(45) Date of Patent: Dec. 4, 2007

(54) BIRD FEEDER

(76) Inventor: Raymon W. Lush, 402 S. 1st St., Bloomfield, NE (US) 68718

( * ) Notice: Subject to any disclaimer, the term of this patent is extended or adjusted under 35 U.S.C. 154(b) by 0 days.

(21) Appl. No.: 11/657,225

(22) Filed: Jan. 24, 2007

Related U.S. Application Data

(62) Division of application No. 11/480,604, filed on Jul. 3, 2006, now Pat. No. 7,198,004.

(51) Int. Cl.
*A01K 39/00* (2006.01)
(52) U.S. Cl. .................................... 119/57.8; 119/52.2
(58) Field of Classification Search ............... 119/57.8, 119/52.2, 21.01, 61.51, 429, 430, 431; D30/124
See application file for complete search history.

(56) References Cited

U.S. PATENT DOCUMENTS

| | | | | |
|---|---|---|---|---|
| 3,568,641 A | * | 3/1971 | Kilham | 119/57.8 |
| 4,201,155 A | * | 5/1980 | Hyde, Jr. | 119/57.8 |
| 4,215,652 A | * | 8/1980 | Kerscher | 119/57.8 |
| 5,123,380 A | * | 6/1992 | Edwards | 119/57.8 |
| 5,215,039 A | * | 6/1993 | Bescherer | 119/57.8 |
| 5,235,935 A | * | 8/1993 | Edwards | 119/57.8 |
| 5,775,257 A | * | 7/1998 | Park | 119/57.8 |
| 5,826,540 A | * | 10/1998 | Bridges | 119/52.3 |

* cited by examiner

*Primary Examiner*—Yvonne R. Abbott
(74) *Attorney, Agent, or Firm*—Dennis L. Thomte; Thomte Law Firm

(57) ABSTRACT

A bird feeder of the tube-type having a vertically disposed hollow body portion formed of metal mesh material or a clear plastic material. The body portion has a plurality of inverted, truncated funnel members or baffles positioned therein in a vertically spaced-apart relationship which maintain a certain amount of feed at that level even though the main feed supply has dropped below that funnel member or baffle.

1 Claim, 5 Drawing Sheets

BIRD FEEDER

CROSS-REFERENCE TO RELATED APPLICATION

This is a divisional application of Petitioner's earlier application Ser. No. 11/480,604 filed Jul. 3, 2006, now U.S. Pat. No. 7,198,004, entitled "BIRD FEEDER".

BACKGROUND OF THE INVENTION

1. Field of the Invention

This invention relates to a bird feeder and more particularly to a tube-type bird feeder. In one embodiment, the feeder body is comprised of a relatively rigid screen material or mesh material preferably comprised of metal with the wires thereof being arranged in vertical and horizontal patterns to create square or rectangular openings therein. In another embodiment, the feeder body is comprised of a clear plastic material having feed openings formed therein. More particularly, both embodiments of the bird feeder of this invention include one or more inverted, truncated funnel members positioned therein in a vertically spaced-apart relationship which maintain a certain amount of feed at that level, even though the main feed supply has dropped below that funnel member.

2. Description of the Related Art

Many types of bird feeders of the tube-type have been previously provided wherein the feeder body is comprised of a relatively rigid screen material or mesh material which define rectangular or square openings not only to enable birds to cling thereto, but to permit birds to feed therefrom. As the feed level in the feeder body drops, that portion of the feeder body above the level of the feed is not useable by the birds. Many prior art bird feeders of the tube-type have been previously provided wherein the tubular feeder body has perch rods extending outwardly therefrom below one or more feed openings formed therein or where the feeder body is constructed of a metal mesh material so that the birds may cling to the feeder body and feed through the mesh openings of the feeder body. As the birds consume the feed from the feeder body, the level of feed drops below certain feed openings making those feed openings inoperable.

SUMMARY OF THE INVENTION

Two embodiments of a bird feeder of the tube-type are disclosed. In one embodiment, the feeder includes an elongated, hollow tubular member having upper and lower ends adapted to have animal food placed therein. The upper end of the tubular member is open, but is selectively closed by a closure member such as a cap or cover. The tubular member is comprised of a mesh material which defines a plurality of square or rectangular feed openings formed therein. At least one, and preferably a plurality, of inverted, truncated funnel members are positioned in the tubular member above the lower end thereof which maintain a certain amount of feed at that level in the tubular member, even though the main supply of animal feed has dropped below the respective funnel member.

In a second embodiment, the tube is constructed of a clear plastic material.

It is therefore a principal object of the invention to provide an improved bird feeder.

Still another object of the invention is to provide an improved bird feeder which includes a hollow tubular member comprised of a mesh material which defines a plurality of feed openings formed therein and which also includes a plurality of inverted, truncated funnel members positioned in the tubular member above the lower end thereof which maintain a certain amount of feed at that level in the tubular member, even though the main supply of animal feed has dropped below the funnel member.

A further object of the invention is to provide a bird feeder of the type described above wherein birds may easily grasp food positioned between the tubular member and the inverted, truncated funnel members positioned in the tubular member.

Still another object of the invention is to provide a bird feeder including "even level" feed baffles or funnels therein in combination with a tubular body member comprised of a mesh material or a clear plastic material.

These and other objects will be obvious to those skilled in the art.

DETAILED DESCRIPTION OF THE INVENTION

Figure 1:
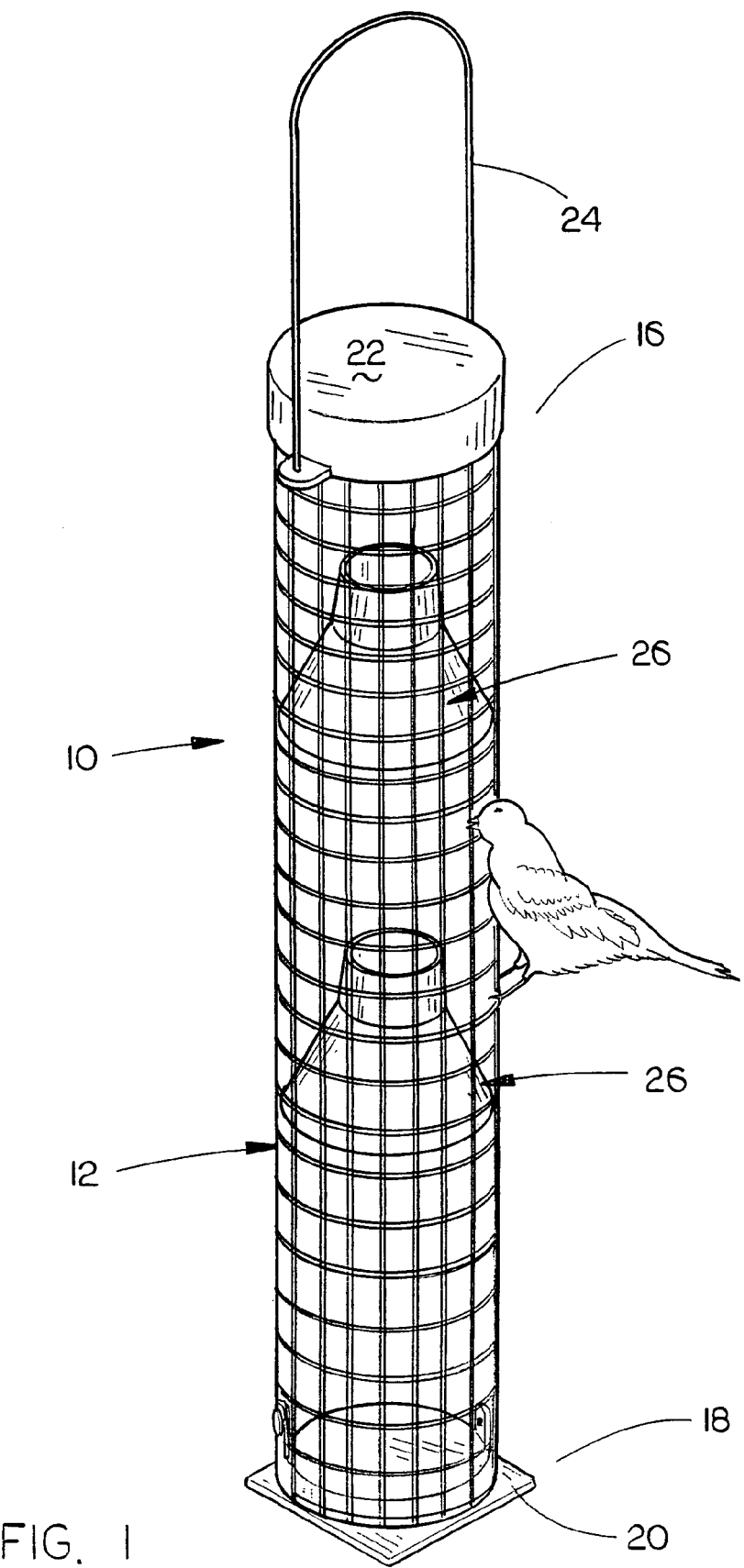
FIG. 1 is a perspective view of a first embodiment of the bird feeder of this invention.

The first embodiment bird feeder of this invention (FIGS. 1-3) is referred to generally by the reference numeral 10 which includes an elongated tubular body portion or body member 12 which is comprised of a mesh material including vertically disposed and horizontally disposed wires which define square or rectangular feed openings therebetween. Body member 12 includes an open upper end 16 and a lower end 18 which preferably has a base 20 positioned thereon so that feed within the tubular body portion 12 may fall thereon. The open upper end of the body portion 12 is preferably closed by a cap or cover 22 and has a hanger 24 connected thereto to suspend the bird feeder 10 from a branch or other support.

Figure 2:
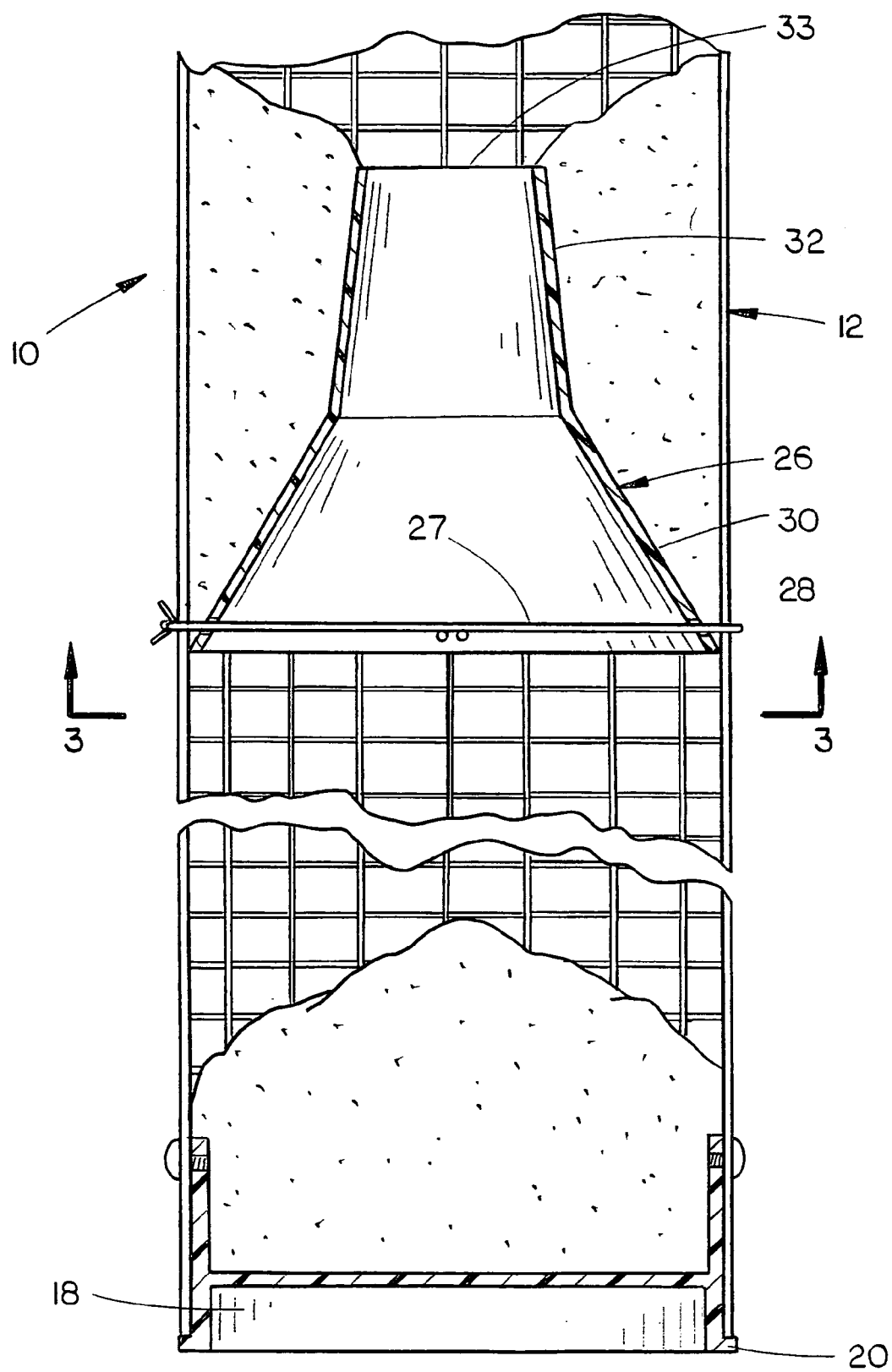
FIG. 2 is a partial sectional view of the feeder of FIG. 1 with portions thereof cut away to more fully illustrate the invention.
Figure 3:
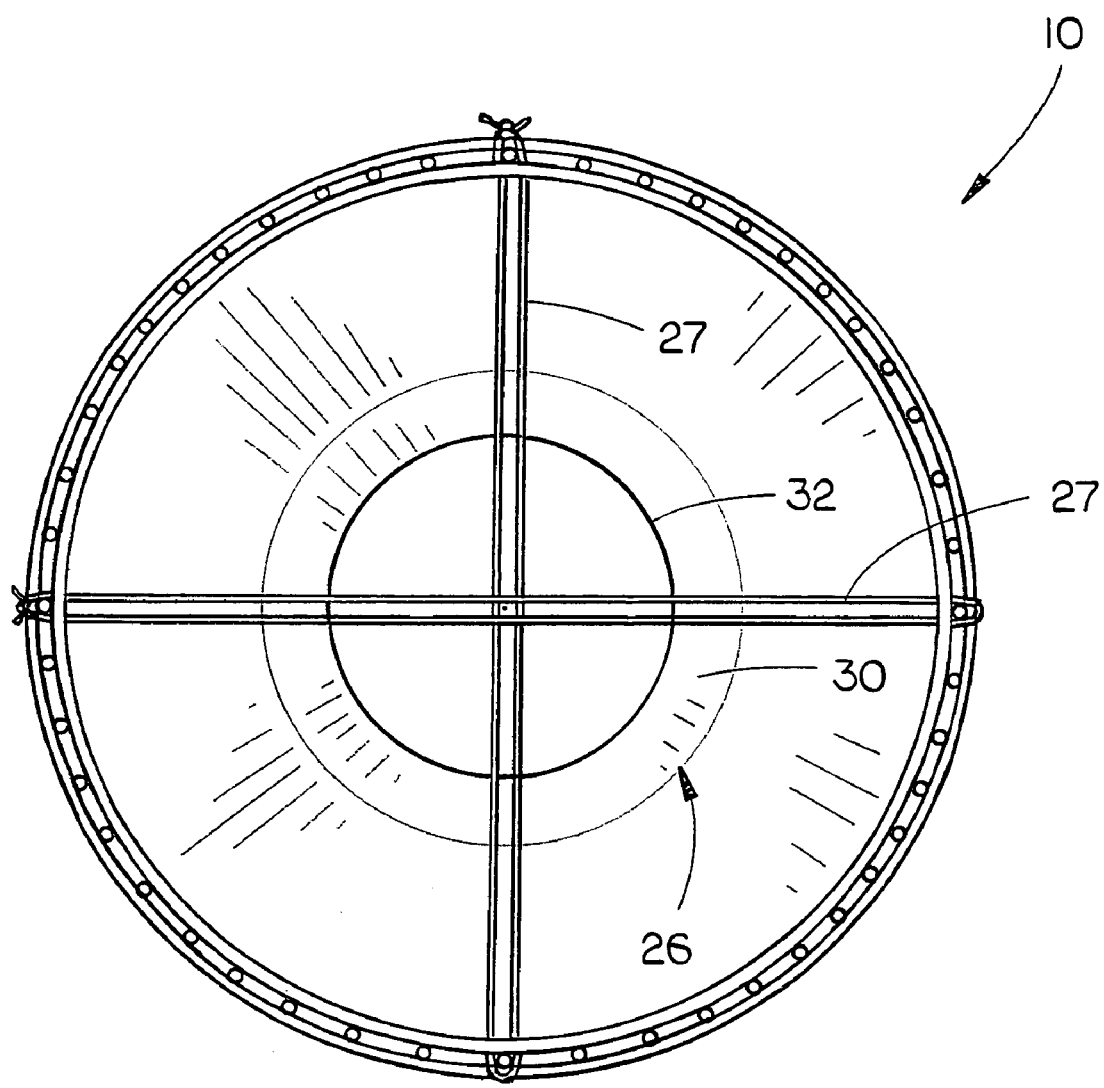
FIG. 3 is a sectional view seen on lines 3-3 of FIG. 2.

A plurality of inverted, truncated funnel-shaped members 26 are positioned in the body portion or body member 12 in a vertically spaced relationship as will now be described. The member 26 may be secured to the body member 12 by any convenient means such as by rods 27 extending through, as illustrated in FIG. 2. Each of the funnel members 26 includes a lower end 28 which is just slightly smaller than the inside diameter of the body member 12 and which has the same cross-sectional configuration. In other words, if the body member 12 is cylindrical, the lower end 28 of the funnel member 26 would also be cylindrical. If the body member 12 is rectangular or of square cross-section, the lower end 28 of the funnel members 26 would have a similar configuration so as to conform to the inside diameter of the funnel members.

Each of the funnel members 26 includes a conical-shaped portion 30 which extends upwardly and inwardly from the lower end 28 to a generally cylindrical portion 32 which extends upwardly therefrom. The upper end of cylindrical portion 32 is open at 33 so that feed may pass downwardly through the funnel member 26 as will now be described.

Assuming that there are a plurality of funnel members 26 secured to and positioned within the body member 12, the feeder is filled as will now be described. The cap or cover 22 is removed and feed is poured into the body member 12 from the upper end thereof with the feed passing to the bottom of the body member 12 through the openings 33 in the cylindrical portions 32. As the body member 12 is filled, the areas between the conical-shaped portions 30 and the cylindrical portions 32 with respect to the body member 12 will be filled with feed.

As the feed in the body member 12 is consumed by birds, a certain amount of feed will remain between the exterior surface of the funnel members 26 and the interior surface of body member 12, as seen in FIG. 2. In other words, the inverted, truncated funnel members 26 positioned in the body member 12 maintain a certain amount of feed at that level, even though the main feed supply has dropped below that funnel member. Therefore, even though the main feed level has dropped below the funnel members 26, there will still be feed between the funnel members and the interior surface of the body member 12 so that birds may feed at various vertical levels on the bird feeder, even though the main feed supply has dropped below those funnel members.

Figure 4:
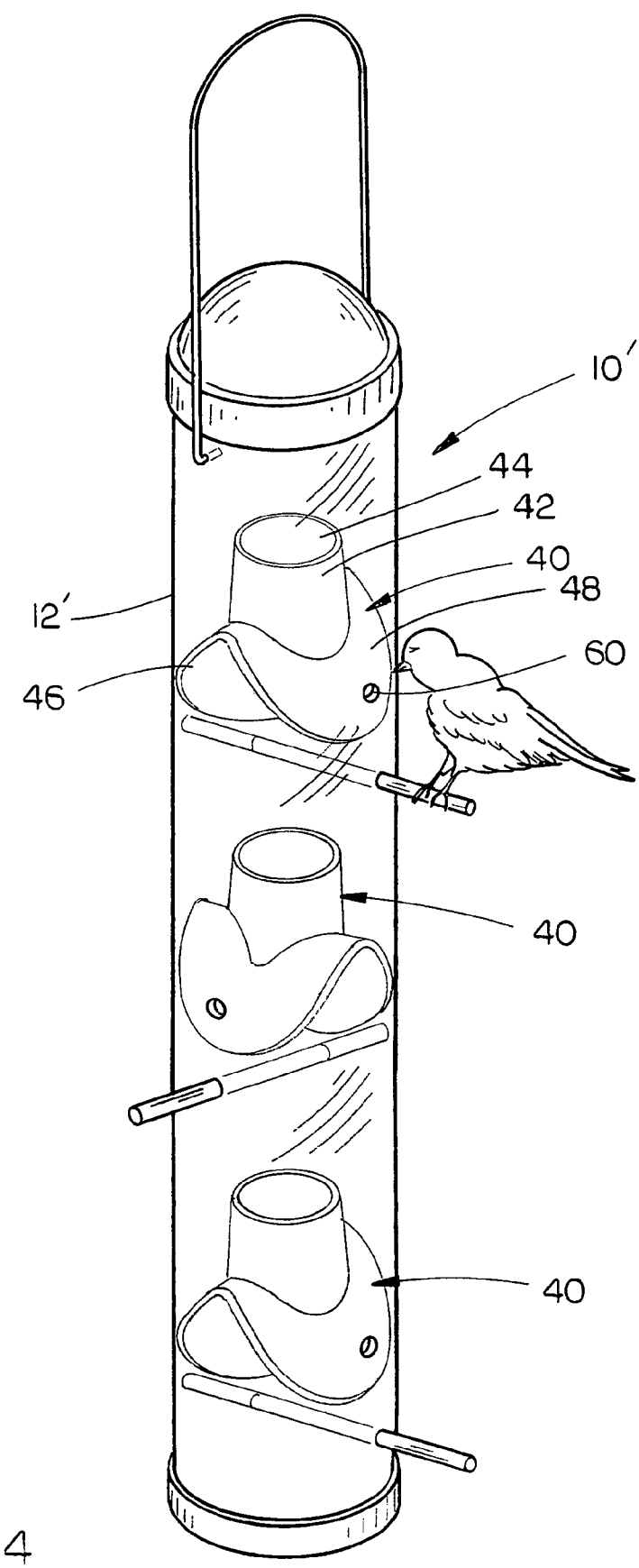
FIG. 4 is a perspective view of a second embodiment of the bird feeder of this invention.
Figure 5:
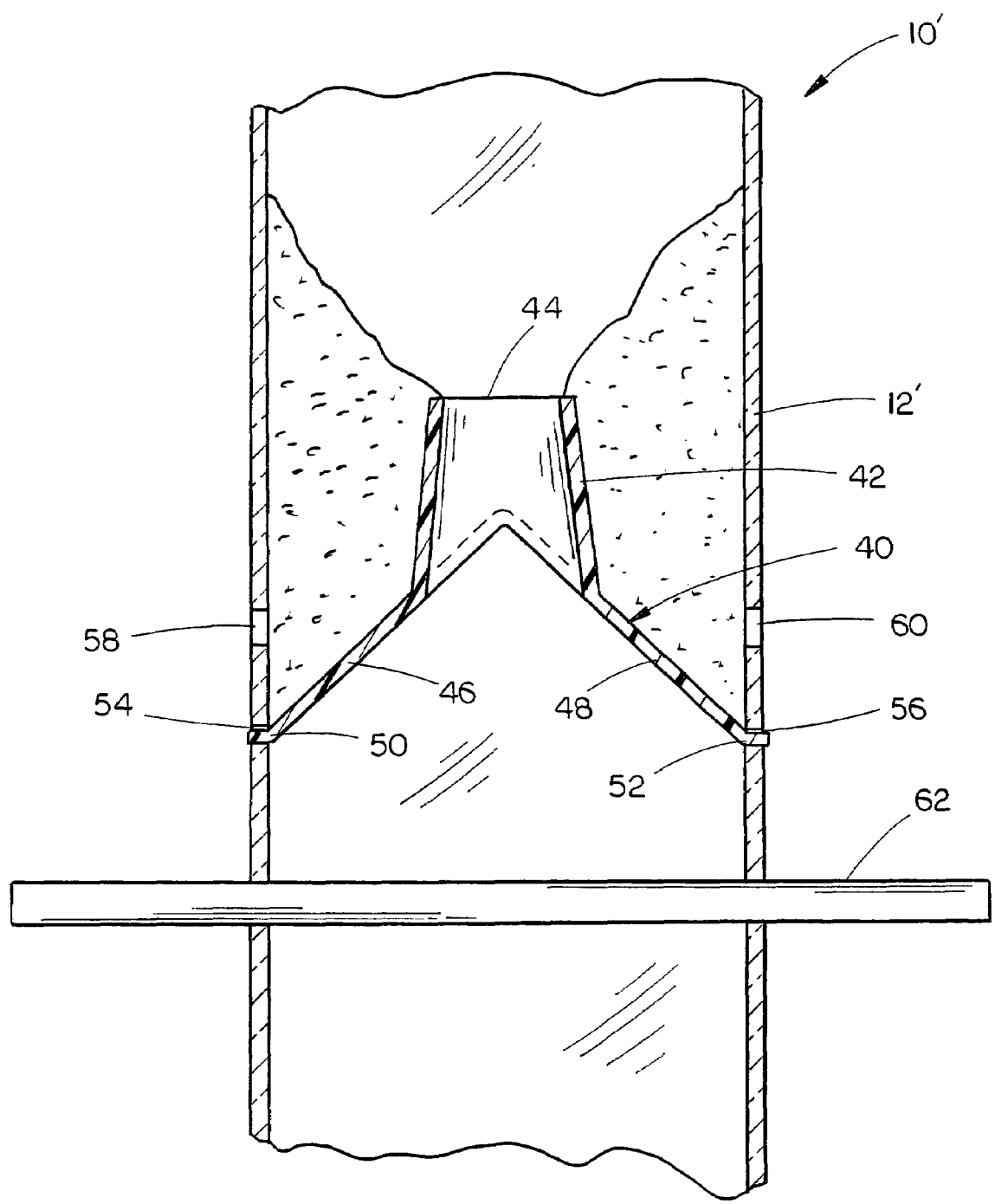
FIG. 5 is a partial sectional view of the bird feeder of FIG. 4.

In FIGS. 4 and 5, the numeral 10' refers to the second embodiment of the bird feeder of this invention. The primary difference between the feeder 10 and the feeder 10' is that the feeder 10' is constructed of a clear plastic material rather than the mesh material of feeder 10. A plurality of baffles or even feed members 40 are positioned within the body member 12' so as to maintain feed thereabove in the same fashion as the funnel members 26 in feeder 10. Each of the baffles 40 includes a generally cylindrical portion 42 having an opening 44 formed therein with a pair of depending skirts 46 and 48 extending downwardly and outwardly therefrom, as illustrated in FIGS. 4 and 5, which close the interior of the body member 12'. The baffles 40 are secured to the tubular body member 12' by any convenient means such as that illustrated in FIG. 5 wherein the lower ends of the skirts 46 and 48 have outwardly extending fingers 50 and 52 which are received in slots 54 and 56 which are formed in the side wall of the feeder body member 12'. Body member 12' has a pair of feed openings 58 and 60 formed therein above the lower ends of the skirts 46 and 48 to enable a bird to feed therethrough. A perch rod 62 is provided below each of the baffles 40, as illustrated in FIG. 5, to enable the birds to perch thereon while feeding through the openings 58 and 60.

The baffles 40 function in the same manner as the funnel members 26 so as to maintain a certain level of feed thereabove, as illustrated in FIG. 5, even though the main level of feed has dropped therebelow so that all of the feeding stations may be utilized.

It can therefore be seen that the bird feeder of this invention accomplishes at least all of its stated objectives.

I claim:

1. A bird feeder of the tube-type, comprising:
an elongated, hollow tubular member having upper and lower ends adapted to have animal food placed therein;
said upper end of said tubular member being open, but being selectively closeable by a closure member;
said tubular member being comprised of a plastic material having vertically spaced feed openings formed therein; and
at least one baffle member positioned in said tubular member above said lower end thereof which maintains a certain amount of feed at that level in the tubular member even though the main supply of animal feed has dropped below said baffle member;
said baffle member including a lower V-shaped skirt portion which is positioned closely to the inside surface of said tubular member;
said baffle member having a hollow cylindrical portion which extends upwardly and inwardly from said skirt portion.

* * * * *